Oct. 18, 1932. L. MARQUÉ 1,883,804
FASTENING DEVICE, MORE ESPECIALLY FOR HOODS
Filed March 31, 1932 2 Sheets-Sheet 2
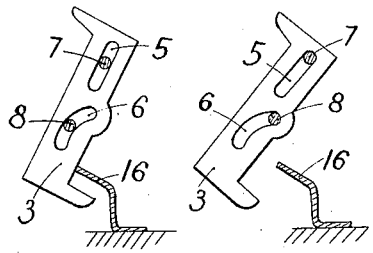
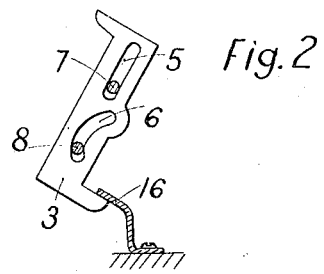
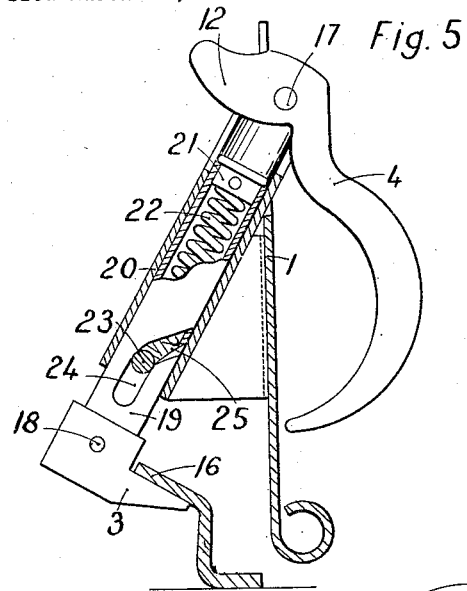
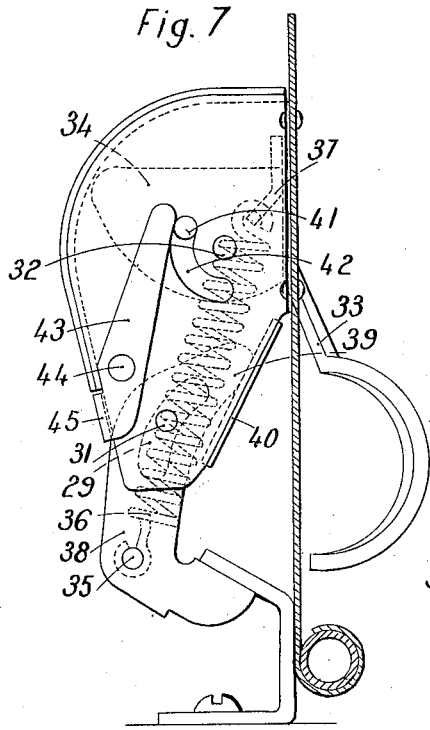
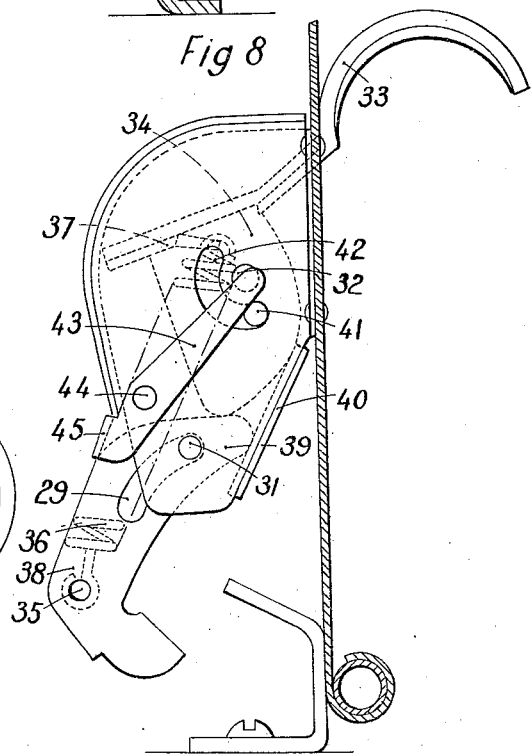
L. Marqué
INVENTOR
By: Marks & Clerk
ATTYS.

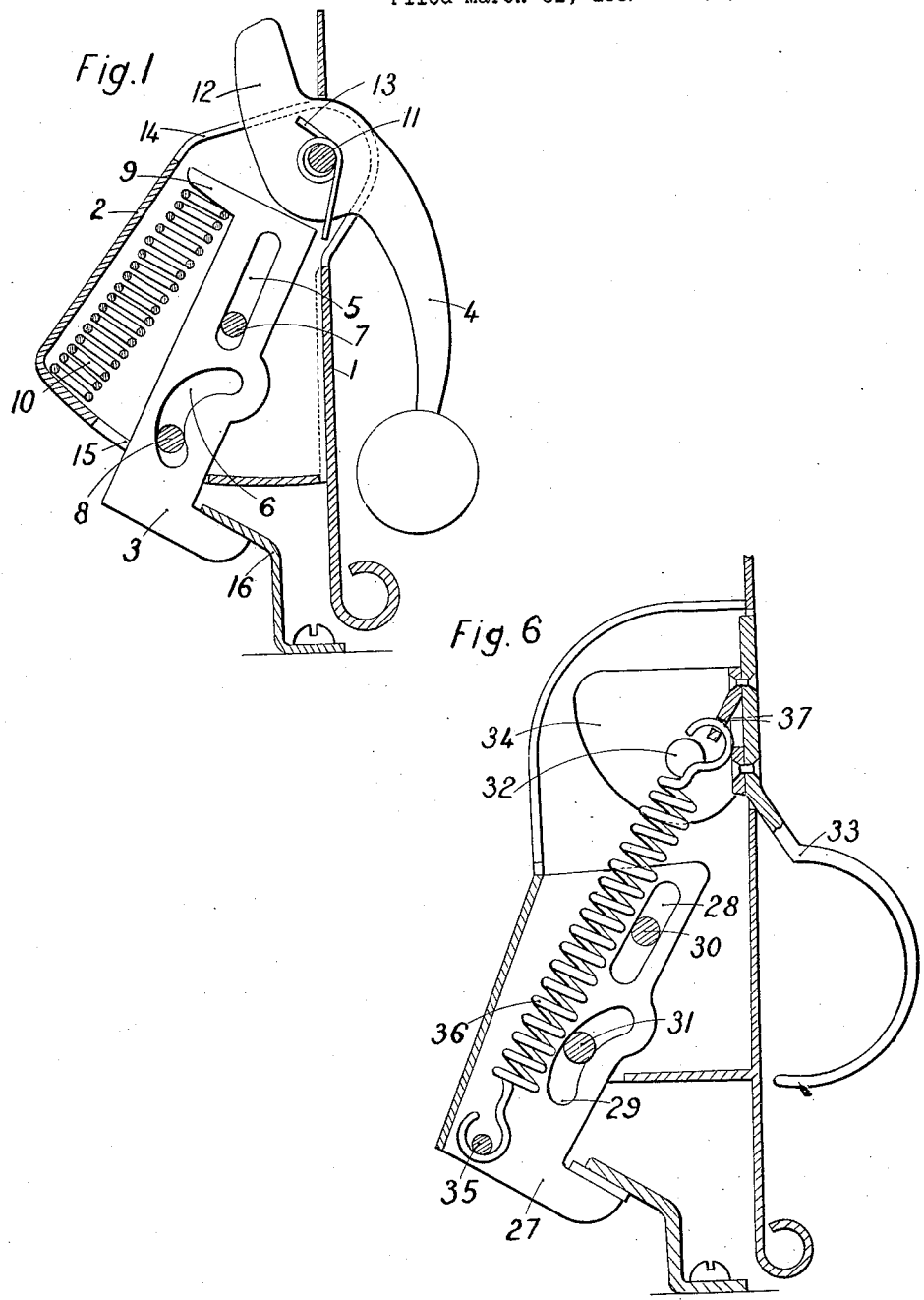

Patented Oct. 18, 1932

1,883,804

UNITED STATES PATENT OFFICE

LÉON MARQUÉ, OF LA GARENNE, FRANCE, ASSIGNOR OF ONE-HALF TO LOUIS MASSUGER, OF LE VESINET, SEINE-ET-OISE, FRANCE

FASTENING DEVICE, MORE ESPECIALLY FOR HOODS

Application filed March 31, 1932, Serial No. 602,281, and in France April 3, 1931.

The present invention relates to improvements in fastening devices, and chiefly to the hood-fastening devices employed upon motor vehicles and aeroplanes.

It relates more particularly to the devices of the type in which the hooking member is acted upon by a spring which holds it in contact with a fastening lug.

The said improvements serve to assure, under different forms, the following advantages:

1. The hook is pressed obliquely upon its attaching member, and thus the hood will be accurately applied upon its supports.

2. The device is rapidly operated, and can thus be opened and closed without any effort and by a single movement.

3. It affords an absolutely reliable fastening, due to the arrangement of the attaching lug, by which the fastening takes place from the interior, whilst the device can only be released by the normal controlling means.

4. The device can be manufactured at a small cost, owing to the improved design of the pieces forming the hood-attaching device, which pieces have a very simple shape and can be manufactured by the punching and pressing process.

In one form of construction, the hook-plate is made of flat iron, and has two slots, of which the first has a straight form and is situated on the axis of the hook-plate, and the second has an arc-shaped form; each of the said slots is traversed by an axle which is permanently secured to the casing or support of the said hook-plate, and said axles thus serve to maintain the hook-plate. A spring, in contact with the support, acts upon the said plate in such manner that it is constantly engaged with the fastening lug. A lever is pivotally mounted on the upper end of the said support and can be operated from the outside of the hood; the lever has a cam-shaped portion by which the hook-plate can be lowered against the action of the said spring, in which movement the plate slides upon the said axles and pivots about the upper axle, thus entirely releasing the fastening hook.

In a simplified construction, the hook-plate is mounted on a tube-shaped member containing the spring which bears against an axle traversing the hook-plate and secured to the support. In the said tube-shaped member carrying the hook-plate are formed two slots, each consisting of a straight part, extended towards the top by a helical portion, and thus when a thrust is exercised, against the action of the spring, by a lever having a cam-shaped portion, this imparts to the rod of the hook-plate a downward helical motion by which the hook is released from the fastening lug. The said lever with cam may be replaced by a push-button.

In another form of construction, the hook-plate consists of a piece of sheet metal which is folded or bent in such manner as to obtain two symmetrical flat parts or flanges, in each of which is formed a straight slot and an arc-shaped slot. The spring is situated between the two flanges, and is attached to the lower part of the hook-plate, and it acts by traction, the upper end of the spring being attached to a pin mounted on the cam-shaped part of the operating lever. This cam-shaped end of the operating lever can be also formed by folding or bending, in such manner as to obtain two flat parts or flanges whose outlined edge acts upon the flanges of the hook-plate.

In another form of construction, the guiding by a straight slot is replaced by a guiding by means of an inclined plane on which the upper end of the hook-plate is slidable.

On the other hand, in order that the fastening arrangement may be irreversible, that is, in order to prevent the device from becoming unfastened in the case of an action upon the hood or under the effect of shocks or jarring, the device comprises, in conformity to the invention, a locking device which can be constituted for example by a member having the form of a shoe which is adapted to bear upon the hook-plate and to maintain it when in the fastening position, and the hook can only be released by operating the lever or by pressing upon a controlling button or by any other way.

In the case in which the device is employed for the fastening of hoods upon aeroplanes, the operating lever may take the shape of a removable handle.

The invention is particularly set forth with reference to the accompanying drawings.

Fig. 1 is a sectional view of a hood-fastening device which is operated by a lever having a cam-shaped portion and acting against the effect of a spring upon a hook-plate which is mounted on its support by means of two tenons or axles, upon which it is slidable.

Figs. 2, 3 and 4 are diagrammatic views explaining the action, and showing the steps of the displacement of the hook-plate upon its guiding tenons.

Fig. 5 is a sectional view showing a hood-fastening device, operated by a lever which has also a cam-shaped portion, but in this device the rod of the hook-plate has the form of a tube.

Fig. 6 is a sectional view of a hood-fastening device in which the spring of the hook-plate acts by traction.

Figs. 7 and 8 show a hood-fastening device which embodies the same principle, but in which the straight guiding is obtained by the sliding of the upper end of the hook-plate, while on the other hand a shoe is adapted to act, when in the fastening position (Fig. 7) in order to hold the hook-plate, it being released when proceeding to the unfastening position (Fig. 8).

Referring to Fig. 1, it is observed that the lateral portion 1 of the hood is suitably apertured in order to receive on its inner face a support 2 adapted to contain the hook-plate 3 and the pivoted operating lever 4. Said hook-plate is made of flat iron plate which is slotted at 5 and at 6; the slot 5 is straight and is situated on the axis of the hook-plate, whilst the slot 6 has the form of a circular arc. These two slots are traversed by respective tenons 7 and 8 which are secured to the sides of the support 2. At the upper end of the plate 3 is a projection 9 which is upwardly urged by a spring 10 whose lower end bears against the lower part of the support 2. On the extended axis passing through the centres of the tenons 7 and 8 is situated an axle 11 which is mounted in the sides of the support 2 and on which is pivotally mounted the lever 4 whose operating branch is situated at the exterior of the side 1 of the hood.

At the upper end of said lever is a cam-shaped portion 12, adapted to make contact with the upper end of the hook-plate 3. A spring 13, engaged upon the axle 11, urges the lever 4 into its normal inoperative position. Suitable slots 14 and 15 are formed in the support 2 and provide for the movements of the cam-shaped end 12 of the lever 4.

The shape of the lower slot 6 is such that whatever be the point of its course at which the hook is situated, when it makes contact with the fastening lug 16, the hook will not be separated from the lug to any appreciable degree, in spite of the oblique position assumed. It is only at the end of its downward motion that the hook is rapidly separated from the lug. The reverse motion of the hook tends, on the contrary, to hold the hood against its supports.

The operation is as follows.

Referring to Fig. 1, the hook 3 is shown in the position in which it is engaged with the lug 16, secured to the vehicle frame, and it is held in this position by the spring 10 which bears against the bottom part of the support 2 and against the lower side of the projection 9 of the hook-plate 3, and thus the hook of the said plate is applied against the lower side of the lug 16 in a constant and reliable manner.

In order to release the said hook, the lever 4 is raised, thus turning about its axle 11, and hence the cam-shaped part 12 is brought into contact with the upper end of the hook-plate 3, thus lowering it against the action of the spring 10. The said hook-plate is thus displaced, due to its slots 5 and 6, upon the tenons 7—8 secured to the support 2, but during this descent while the upper part of the plate 3 moves on a straight path on the tenon 7 by reason of the form of the slot 5, the lower end of the plate, due to the arc-shaped form of the slot 6, slides upon its tenon while describing a circular arc, and is thus separated from the lug 16; hence at the end of the stroke the hook is entirely disengaged from the lug.

Figs. 2, 3 and 4 show the different steps of the displacement of the hook-plate under the action of the operating lever 4.

Fig. 2 shows the position which is observed in Fig. 1.

In Fig. 3, the hook-plate is half-way on its down-stroke, and the slots 5—6 have moved upon the tenons 7—8; due to the curved shape of the slot 6, when the said plate descends it pivots slightly on the tenon 7, but without being separated from the lug 16.

In Fig. 4, the hook-plate is at the end of its down-stroke, and thus upper ends of the slots are in contact with their respective tenons. Towards the end of its stroke, and by reason of the curvature of the slot 6, the plate has pivoted on the tenon 7 and has rapidly moved away from the lug 16.

The side of the hood can now be raised.

When the lever 4 is moved in the contrary direction, the hook is again brought into contact with the lug 16.

Due to the arrangement of the spring 10 which acts upon the projection 9 of the plate 3, the hook will always be brought into the fastening position in a reliable manner, even through the parts in contact may become worn after a long use, as the play is at all times taken up by the expansion of the spring.

On the other hand, due to the simple forms employed, the pieces forming the hood-attaching device can be produced by the punching, pressing and stamping processes, and can thus be manufactured at a very moderate cost. Furthermore, the support 2 containing the mechanism can be secured to the side 1 of the hood by the use of only four screws or rivets, and the said support will project only slightly from the hood through an aperture enabling the lever 4 to be operated.

Fig. 5 shows a modification of the device, in which the construction is simplified, and herein the operation is again effected by means of a lever 4 which is pivotally mounted at 17 on the support and comprises a cam-shaped part 12.

The hook 2 is fastened by a pin at 18 to a tube-shaped rod 19 slidable in a support 20 of a like form which is secured to the side 1 of the hood. The upper end of the rod 19 is mounted by an axle 17 on a push-piece 21; the action of a spring 22 situated within the device and in contact with a tenon 23 traversing the rod 19 and secured to the portion, of like form, of the support 20 tends to bring the hook 3 into contact with the inferior side of the lug 16.

The tenon 23 traverses the rod 19 through two oppositely situated slots, each consisting of a straight part 24 followed by a helical part extending upwardly upon 90°.

The operation is as follows. When the lever 4 is raised, it thus pivots on its axle 17, hence driving down the rod 19 of the hook 3 against the action of the spring 22, due to the pressure of the cam 12 upon the push-piece 21. The rod 19 is thus lowered, but owing to the form of the slots 24—25 traversed by the tenon secured to the support, this straight motion is transformed into a helical motion of the said rod, which turns the hook 3 through a 90-degree angle, thus entirely releasing it from the fastening lug 16. The hood can now be raised.

In the construction shown in Fig. 6, the hook-plate 27 consists of a piece of sheet metal which is folded over and bent at an angle, in order to give it a U cross-section. In each flat part or flange of this U-shaped member are formed a straight slot 28 and a curved slot 29, which are traversed by the respective pins 30—31, secured at their ends to the support of the hood-attaching device.

The operating lever 33 is pivoted at 32, and it comprises two flat parts or flanges 34 having the shape of a cam and adapted to be brought into contact with the flanges of the hook-plate 27. Between the flanges of the hook-plate 27 and at the lower part of the latter, is mounted a pin 35 to which a spring 36 is hooked; the other end of said spring is hooked at 27 to a lug or tongue which is mounted between the flanges 34 of the lever 33.

As will be observed in the figure, the lug 37 for attaching the spring 36 is situated above the pivoting axle 32 of the lever 33 and is somewhat to the right of the axis passing through the pin 35 and the axle 32; thus the spring 36 is well stretched when the hook 27 is engaged with its securing lug. On the other hand, due to this position of the pin 37, the lever 33 will be automatically brought towards the hood.

In order to construct the said hood-attaching device, the hook and also the cam of the operating lever must each consist of a folded or bent piece, in order to provide a space between the flanges to contain the spring, the lug and the pin; but since the axle 32 of the lever does not traverse this latter, this axle consists simply of two rivets forming axles and connecting each flange 34 of the lever with the respective sides of the support of the hood-attaching device.

As will be observed, the cam 34 consists of a U-shaped member which is suitably riveted to the lever 33, but it is obvious that the flanges of the cam might be formed in one with the said lever. On the other hand, due to the curved form of the end of the lever which serves as an operating handle, the lever when in the fastening position comes close to the sheet metal of the hood and hence the opening which allows the lever to be operated is not visible.

In the arrangement shown in Figs. 7 and 8, the form of the hook-plate resembles the form of the plate 27 shown in Fig. 6, but in this construction each flange has only a curved slot 29 by which it is guided upon the pin 31; the upper part 39 of the plate is slidable on an inclined ramp 40 by which it is guided in a straight path. The operating lever 33 is analogous to the one shown in Fig. 6; it has two flanges 34 and can be turned about the axles 32. The hook-plate is urged by a spring 36 which is hooked at 35, as shown in Fig. 6, to the hook-plate, and also to a lug 37 secured to the lever 33.

One of the flanges 34 carries a stud 41 which extends to the outside of the support, in which latter is formed a slot 42 having the shape of a circular arc; said stud is adapted to act upon a lever 43 which is mounted at the exterior of the support and one side of the latter, and is pivoted to the same at 44. The lower end of this lever is bent into a right-angled shape at 45, and the edge thus formed makes contact with the back of the hook-plate 38 thus maintaining it in its fastening position. The device is so arranged that when the stud 41 moves away during the operation of the lever 33, the edge of the lever will remain in contact with the back part of the hook-plate, but does no more prevent its rotation allowing it to disengage the lug.

The operation of the said device will be clearly understood with reference to Figs. 7 and 8, which show the two extreme positions of the device.

All of the parts used for the hood-fastening devices hereinabove described may be manufactured by the stamping or pressing process, and by folding or bending into shape, by reason of their simple forms, and hence they can be produced at a very small cost.

I claim:

1. A fastening device, comprising an attaching lug, a support secured to the part to be fastened, a hook-shaped member adapted to engage the said attaching lug, elastic means for maintaining the hook in contact with the said attaching lug, a controlling device adapted to act upon said hook-shaped member, means for straight guiding including a ramp secured to the support and upon which the upper end of the hooked shaped member is slidable, and means for curvilinear guiding provided at the lower part of said member.

2. A fastening device, comprising an attaching lug, a support secured to the part to be fastened, a hook-shaped member adapted to engage the said attaching lug, elastic means for maintaining the hook in contact with the said attaching lug, a controlling device adapted to act upon said hook-shaped member, means for straight guiding provided at the upper part of the said hook-shaped member, and means for curvilinear guiding provided at the lower part of said member, said guiding means including a tube secured to the support, a rod on the hooked-shaped member provided with a slot, and a stud provided on the tube and extending through the slot in the rod, whereby the downward movement of the hook-shaped member will be combined with a movement of rotation about the axis of its rod.

3. A fastening device, comprising an attaching lug, a support secured to the part to be fastened, a hook-shaped member in the form of a piece of sheet metal bent into a U-shape to provide flanges, a spring mounted between the flanges for holding the hook-shaped member in contact with the lug, a control device adapted to act upon the hook-shaped member including a lever having two flanges making contact with the flanges of the hook-shaped member, and guiding means so arranged that when the controlling device acts upon the hook-shaped member, the latter will first descend then be given a movement of rotation by which the hook-shaped member is separated from said attaching lug.

4. A fastening device, comprising an attaching lug, a support secured to the part to be fastened, a hook-shaped member adapted to engage the said attaching lug, elastic means for maintaining the hook in contact with the said attaching lug, a controlling device adapted to act upon said hook-shaped member, means for straight guiding provided at the upper part of the said hook-shaped member, means for curvilinear guiding provided at the lower part of said member, a lever pivotally mounted on the support and provided with a shoe adapted to bear upon the back part of the hook, and a stud mounted on the controlling device and adapted to act upon the lever in order to hold the said shoe in contact with the back part of the hook.

In testimony whereof he has signed this specification.

LÉON MARQUÉ.